United States Patent [19]
Ishikawa et al.

[11] Patent Number: 6,031,801
[45] Date of Patent: Feb. 29, 2000

[54] APPARATUS AND METHOD FOR REPRODUCING DATA RECORDED AT A PREDETERMINED LINEAR VELOCITY ON A DISC-LIKE RECORDING MEDIUM

[75] Inventors: Hideki Ishikawa; Takeshi Hachimori; Mitsuru Okabe, all of Kanagawa, Japan

[73] Assignee: Sony Corporation, Tokyo, Japan

[21] Appl. No.: 08/890,108

[22] Filed: Jul. 9, 1997

[30] Foreign Application Priority Data

Jul. 10, 1996 [JP] Japan ..................................... 8-180955
Jul. 17, 1996 [JP] Japan ..................................... 8-205507
Jul. 17, 1996 [JP] Japan ..................................... 8-205508

[51] Int. Cl.[7] ......................................................... G11B 7/00
[52] U.S. Cl. ................................................ 369/50; 369/47
[58] Field of Search .................................. 369/50, 47, 48, 369/58, 54

[56] References Cited

U.S. PATENT DOCUMENTS 5,528,574  6/1996  Takeuchi et al. ........................... 369/50

Primary Examiner—Thang V. Tran
Attorney, Agent, or Firm—Frommer Lawerence & Haug, LLP; William S. Frommer; Dennis M. Smid

[57] ABSTRACT

A disc playback apparatus for playing back a disc on which data have been recorded under a CLV control is provided with a CLV control section for performing a CLV control, a speed comparator and a reference clock generator for performing a CAV control, a changeover switch for switching between the CLV control and the CAV control, and a CPU for setting a switching point of the changeover switch and controlling the switching of the changeover switch. According to another aspect of the invention, switching is made between a playback with a CLV servo control and a playback with a CAV servo control in accordance with the reproduction scanning position in the disc radial direction. In particular, a difference between disc rotation speeds at the disc innermost and outermost tracks is made smaller than that in a case where a playback is performed at a specific linear velocity over the disc entire area. According to a further aspect of the invention, regions are set by dividing the disc entire area in the disc radial direction. A judgment is made of a region to which a current reproduction scanning position belongs, and control is made so as to switch the playback linear velocity in accordance with the region thus determined. In particular, a difference between disc rotation speeds at the disc innermost and outermost tracks is made smaller than that in a case where the linear velocity is not changed over the disc entire area.

12 Claims, 13 Drawing Sheets

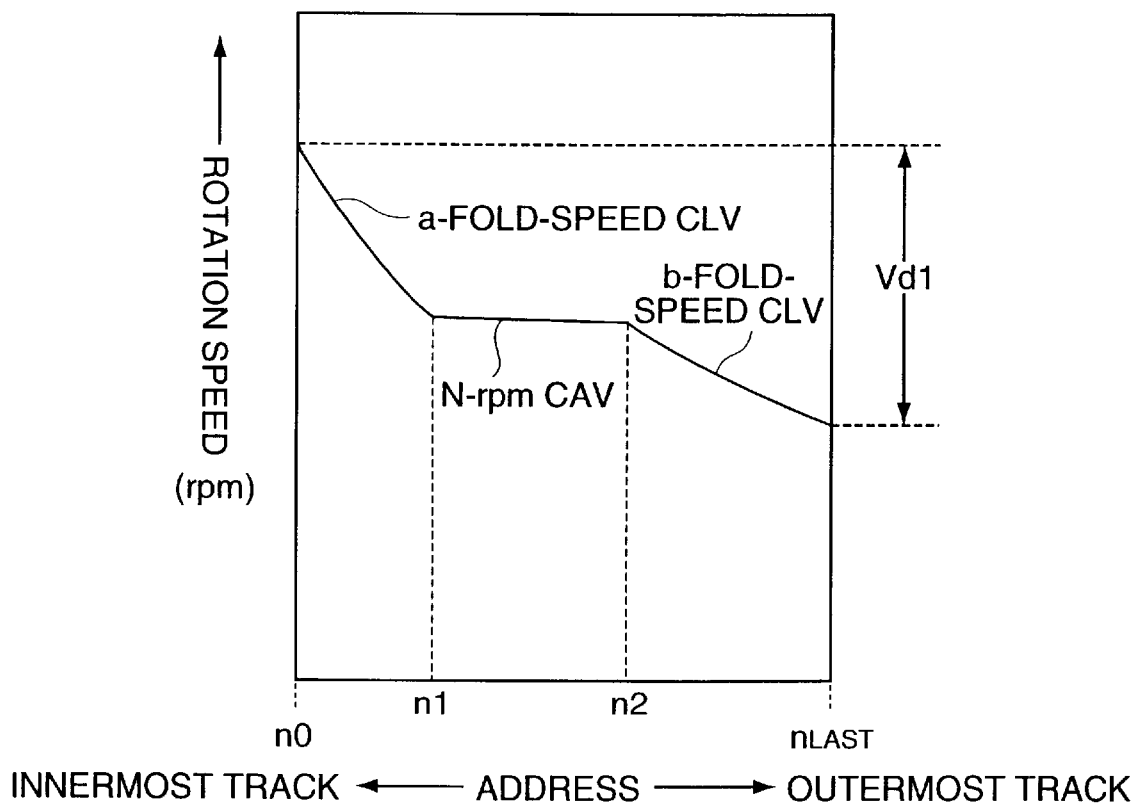

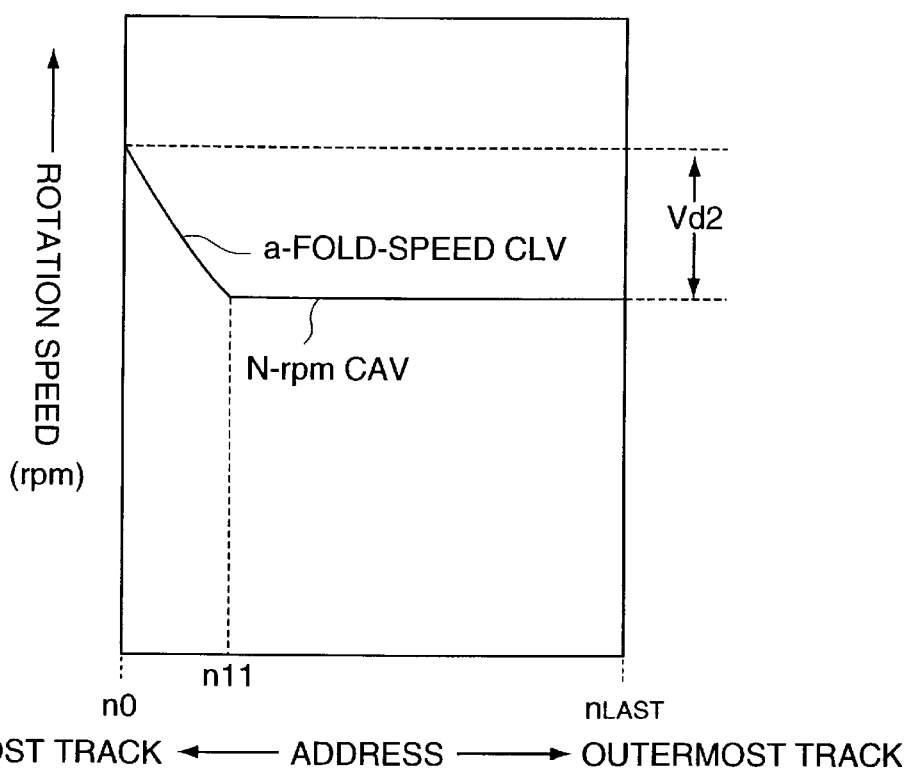
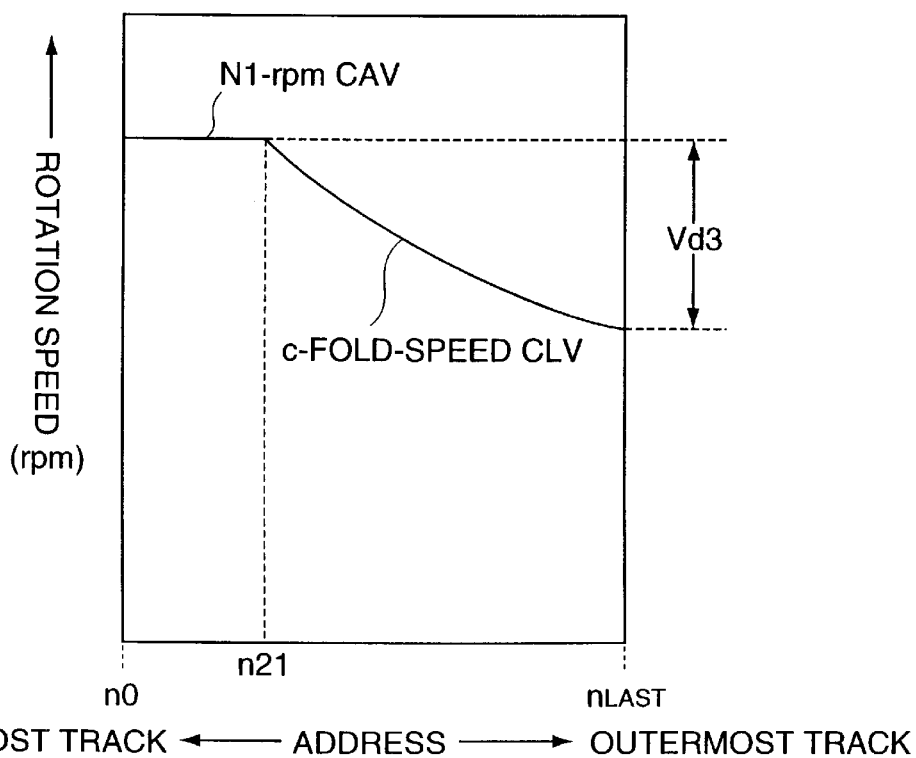

FIG. 12

| | ADDRESSES | LINEAR VELOCITY |
|---|---|---|
| REGION-1 | n0 ~ n1 | h-FOLD SPEED : (1.3m/s) × h |
| REGION-2 | n1+1 ~ n2 | h + 0.5-FOLD SPEED : (1.3m/s) × (h + 0.5) |
| REGION-3 | n2+1 ~ n3 | h + 1.0-FOLD-SPEED : (1.3m/s) × (h + 1.0) |
| REGION-4 | n3+1 ~ n4 | h + 1.5-FOLD SPEED : (1.3m/s) × (h + 1.5) |
| REGION-5 | n4+1 ~ nLAST | h + 2.0-FOLD SPEED : (1.3m/s) × (h + 2.0) |

APPARATUS AND METHOD FOR REPRODUCING DATA RECORDED AT A PREDETERMINED LINEAR VELOCITY ON A DISC-LIKE RECORDING MEDIUM

BACKGROUND OF THE INVENTION

The present invention relates to a playback apparatus of a disc-like recording medium on which data have been recorded according to the constant linear velocity (CLV) scheme. For example, the disc-like recording medium is what is called a compact disc (CD).

Among memories dedicated to reproduction is a CD-ROM (compact disc-read only memory), which is played back while the disc rotation speed is controlled according to the constant linear velocity (hereinafter referred to as CLV) scheme. Therefore, in a disc playback apparatus for playing back CD-ROMs, to realize the above CLV control, the disc rotation speed is varied in accordance with the position on a disc (track position or radial position) which position is being subjected to reproduction by an optical head, i.e., an optical pickup.

In recent years, disc playback apparatuses are common that play back a CD-ROM at a speed two times (2-fold-speed playback), four times (4-fold-speed playback), or six times (6-fold-speed playback) the normal playback speed, or at other accelerated speeds. Apparatuses capable of playing back a CD-ROM at a speed even eight times the normal playback speed (8-fold-speed playback) are now being put into the market. The "normal playback speed" as used above is equal to the playback speed of the compact disc (CD), i.e., 1.2–1.4 m/s. In the following description, the 2-fold-speed playback, 4-fold-speed playback, 6-fold-speed playback, 8-fold-speed playback, etc. are collectively referred to simply as "accelerated speed playback."

The above disc playback apparatuses perform the CLV control even in playing back a CD-ROM at an accelerated speed as mentioned above. As a result, in an accelerated speed playback, a difference between a disc rotation speed at the disc innermost track and that at the outermost track is larger than in a normal speed playback. The difference is particularly large in an 8-fold-speed playback.

FIG. 1A shows a relationship between the radial reproduction position on a disc and the disc rotation speed, that is, the number of revolutions per minute of a spindle motor for driving, i.e., rotating the disc, in an 8-fold-speed playback. In the case of playing back a CD-ROM at the normal playback speed, it is prescribed that the linear velocity should be within the range of 1.2 to 1.4 m/s. In FIG. 1A, a solid line and a broken line represent relationships between the reproduction position (track position) and the motor rotation speed in 8-fold-speed playbacks corresponding to the normal playback speed linear velocities 1.4 m/s and 1.2 m/s; respectively. For example, in the case of an 8-fold-speed playback corresponding to the normal playback speed linear velocity 1.4 m/s, the number of motor revolutions per minute is 4,240 rpm at the disc innermost track, gradually decreases toward the disc outermost track, and is 1,867 rpm at the outermost track. In the case of an 8-fold-speed playback corresponding to the normal playback speed linear velocity 1.2 m/s, the number of motor revolutions per minute is 3,634 rpm at the disc innermost track, gradually decreases toward the disc outermost track, and is 1,600 rpm at the outermost track. Thus, as seen from FIG. 1A, the difference in the number of motor revolutions per minute between the disc innermost and outermost tracks is very large.

FIG. 1B shows a relationship between the radial position on a disc and the transfer rate of data that is output from the disc playback apparatus when a CD-ROM is played back at the 8-fold speed as mentioned above. As seen from FIG. 1B, when a CD-ROM is played back at the 8-fold speed under the CLV control, the data transfer rate is constant, that is, data transfer rates at the disc innermost and outermost tracks are the same. The transfer rate of the 8-fold-speed playback under consideration is 1,200 KB/s (kilobytes per second).

In what is called a full-stroke access in which a playback is performed by moving the optical pickup rapidly from the disc innermost track to the outermost track or vise versa, it is necessary to rapidly decrease the disc rotation speed from the one at the innermost track to the one at the outermost track, or rapidly increase the disc rotation speed from the one at the outermost track to the one at the innermost track. To this end, the spindle motor for rotating a CD-ROM is required to be capable of generating large torque. In particular, to reduce the time required for a full-stroke access, very large torque is needed. Spindle motors that can produce such large torque are expensive, and the mechanical parts of a CD-ROM drive should be ones capable of withstanding such large torque. Further, since the spindle motor is accelerated or decelerated at each access, large power is consumed for driving of the spindle motor.

As described above, to perform an 8-fold-speed playback, the disc rotation speed should be made maximum at the disc innermost track and the number of motor revolutions per minute at the disc innermost track amounts to 4,240 rpm at the maximum, possibly resulting in very large vibration due to surface shakes, eccentricity, etc. of a disc. Therefore, the mechanical parts of the CD-ROM drive should be highly accurate ones capable of minimizing surface shakes and eccentricity of a disc as well as be highly strong.

SUMMARY OF THE INVENTION

The present invention has been made in view of the above circumstances in the art, and an object of the invention is therefore to provide a disc playback apparatus and method which can reduce the torque that a spindle motor is required to produce, can reduce the degrees of surface shakes and vibration of a disc, can simplify the mechanical parts, and can shorten an access time and reduce the power consumption.

According to a first aspect of the invention, there is provided a disc playback apparatus which plays back a disc-like recording medium on which data have been recorded at a predetermined constant linear velocity, comprising CLV control means for controlling a disc rotation speed so that a linear velocity is kept constant; CAV control means for controlling the disc rotation speed so that an angular velocity is kept constant; switching means for switching a disc rotation control between a control by the CLV control means and a control by the CAV control means; point setting means for setting a disc rotation control switching point of the switching means; and control means for controlling switching of the switching means in accordance with the switching point that is set by the point setting means.

According to a second aspect of the invention, there is provided a disc playback apparatus which reproduces data that have been recorded on a disc-like recording medium at a predetermined linear velocity, comprising CLV control means for controlling a disc rotating operation so that a linear velocity is kept constant; CAV control means for controlling the disc rotation operation so that an angular velocity is kept constant; and playback control means for switching a playback mode between a first mode using the CLV servo means and a second mode using the CAV control means in accordance with a radial reproduction position on the disc-like recording medium.

According to a third aspect of the invention, there is provided a disc playback apparatus which reproduces data that have been recorded on a disc-like recording medium at a predetermined constant linear velocity, comprising region determining means for setting regions by dividing a recording area of the disk-like recording medium in a radial direction, and determining one of the divided regions that is subjected to a current reproduction scan; and playback control means for controlling, in a switched manner, a reproduction linear velocity in accordance with a radial position of the region determined by the region determining means.

BRIEF DESCRIPTION OF THE DRAWINGS

FIG. 6 shows a data table used in the disc playback apparatus according to the second embodiment which table sets regions on a disc and servo control types for the respective regions;

FIG. 7 shows a relationship between the disc regions and rotation speeds in the disc playback apparatus according to the second embodiment;

FIGS. 8–10 show servo switching schemes in the disc playback apparatus according to modifications of the second embodiment;

FIG. 12 shows a data table used in the disc playback apparatus according to the third embodiment which table sets regions on a disc and linear velocities for the respective regions;

DESCRIPTION OF THE PREFERRED EMBODIMENTS

Specific embodiments of the present invention will be hereinafter described with reference to the accompanying drawings.

Figure 2:
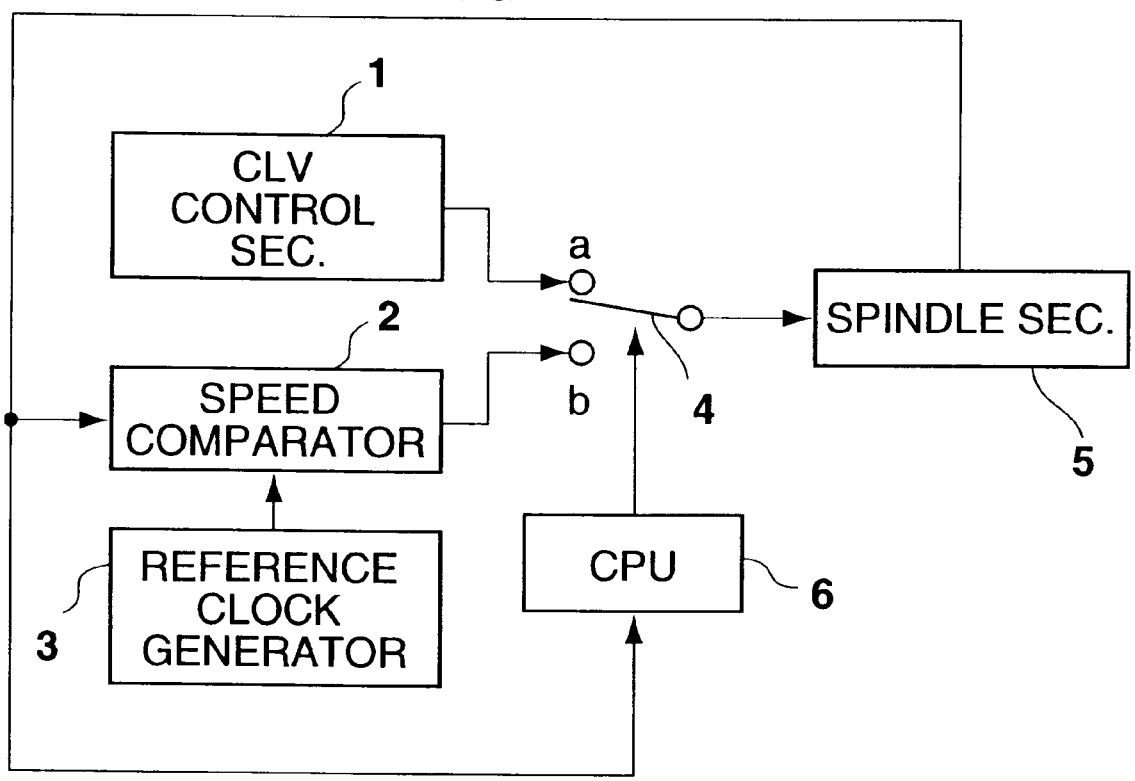
FIG. 2 is a block diagram showing a general configuration of a disc playback apparatus according to a first embodiment of the present invention.

FIG. 2 shows a general configuration the main part of a disc playback apparatus according to a first embodiment as an implementation of a disc playback apparatus and method of the invention. This disc playback apparatus is to play back a CD-ROM and applicable to a CD-ROM drive for playing back a CD-ROM.

Referring to FIG. 2, a spindle section 5 has, as main components, a spindle motor for driving, i.e., rotating a CD-ROM, a spindle driver for generating a drive voltage for driving the spindle motor, and a FG pulse detector for outputting a FG pulse signal as the spindle motor rotates.

A CLV control section 1, which is a linear velocity control means for controlling the disc rotation speed to provide a constant linear velocity, generates a disc rotation speed control signal for the CLV control based on a frame sync signal included in a reproduction signal that is obtained by playing back a CD-ROM, as in the case of conventional disc playback apparatuses.

The disc rotation speed control signal generated by the CLV control section 1 is supplied to a changeover terminal a of a changeover switch 4 (switching means). Thus, when the changeover switch 4 is switched to the changeover terminal a, the disc rotation speed control signal that has been sent from the CLV control section 1 is supplied to the spindle section 5.

In the spindle section 5 supplied with the disc rotation speed control signal, the spindle driver generates a drive voltage for driving the spindle motor from the disc rotation speed control signal and the spindle motor is driven according to the thus-generated drive signal. In this manner, the rotation speed of the spindle motor, i.e., the disc rotation speed of a CD-ROM, is CLV-controlled.

A speed comparator 2 and a reference clock generator 3 together constitute an angular velocity control means for controlling the disc rotation speed to provide a constant angular velocity (hereinafter referred to as CAV). The reference clock generator 3 generates a reference clock signal, which is supplied to the speed comparator 2. The reference clock signal corresponds to a disc rotation speed that is used as a reference in CAV-controlling the disc rotation speed. The speed comparator 2 compares the number of clocks per unit time of the reference clock signal with the number of pulses per unit time of the FG pulse signal that is sent from the FG pulse detector of the spindle section 5, to thereby determine a difference between the actual disc rotation speed and a reference disc rotation speed corresponding to the reference clock signal. The speed comparator 2 generates a disc rotation speed control signal in accordance with the thus-determined difference.

The disc rotation speed control signal generated by the speed comparator 2 is a signal to equalize the number of pulses per unit time of the FG pulse signal to the number of clocks per unit time of the reference clock signal, that is, to equalize the number of pulses per unit time of the FG pulse signal which corresponds to the actual disc rotation speed (rotation speed of the spindle motor) to the number of clocks per unit time of the reference clock signal which corresponds to the reference disc rotation speed for CAV control. More specifically, when the number of pulses per unit time of the FG pulse signal is larger than the number of clocks per unit time of the reference clock signal, that is, when the actual disc rotation speed is faster than the reference disc rotation speed, the disc rotation speed control signal serves to reduce the rotation speed of the spindle motor to thereby equalize the actual disc rotation speed to the reference disc rotation speed. Conversely, when the number of pulses per unit time of the FG pulse signal is smaller than the number of clocks per unit time of the reference clock signal, that is, when the actual disc rotation speed is slower than the reference disc rotation speed, the disc rotation speed control signal serves to increase the rotation speed of the spindle motor to thereby equalize the actual disc rotation speed to the reference disc rotation speed.

The disc rotation speed control signal generated by the speed comparator 2 is supplied to a changeover terminal b of the changeover switch 4. Thus, when the changeover switch 4 is switched to the changeover terminal b, the disc rotation speed control signal that has been sent from the speed comparator 2 is supplied to the spindle section 5.

In the spindle section 5 supplied with the disc rotation speed control signal from the speed comparator 2, the spindle driver generates a drive voltage for driving the spindle motor from the disc rotation speed control signal and the spindle motor is driven according to the thus-generated drive signal. In this manner, the rotation speed of the spindle motor, i.e., the disc rotation speed of a CD-ROM, is CAV-controlled. With this CAV control, the rotation of the CD-ROM is controlled so that it is rotated at a constant rotation speed, i.e., at a constant angular velocity irrespective of the radial position (track position) on the disk which position is being subjected to reproduction by the optical pickup.

The CPU (central processing unit) 6 not only controls the operations of the respective sections but also has functions as a switching point setting means for setting a disc rotation speed control switching point of the changeover switch 4 and a control means for controlling the switching of the changeover switch 4 in accordance with the thus-set switching point. To realize the functions as the switching point setting means and the control means, the CPU 6 counts pulses of the FG pulse signal coming from the spindle section 5 and calculates an actual disc rotation speed from the number of pulses per unit time of the FG pulse signal. When the thus-calculated actual disc rotation speed has reached a given disc rotation speed (which is the same as the reference disc rotation speed in this embodiment) that is preset as the switching point, the CPU 6 performs a switching control to switch the changeover switch 4 from the changeover terminal a to the changeover terminal b. Conversely, when the actual disc rotation speed is slower than the given disc rotation speed, the CPU 6 performs a switching control to leave the changeover terminal a selected.

Figure 1A:
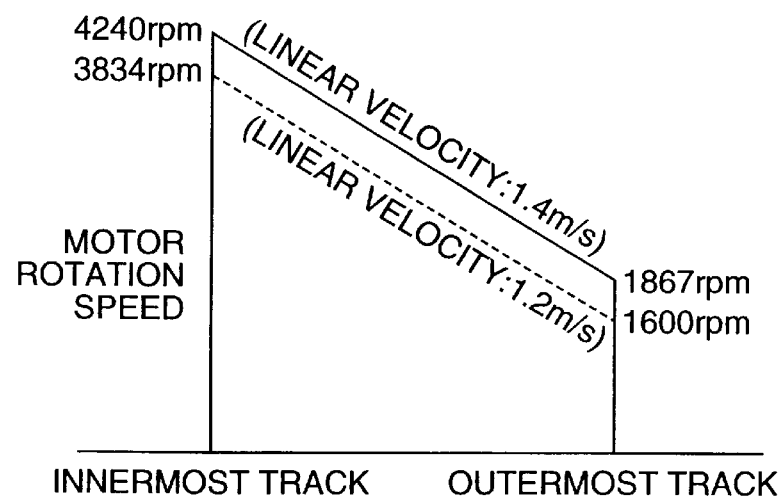
FIG. 1A shows a relationship between the radial position on a disc and the motor rotation speed in a conventional disc playback apparatus.
Figure 3A:
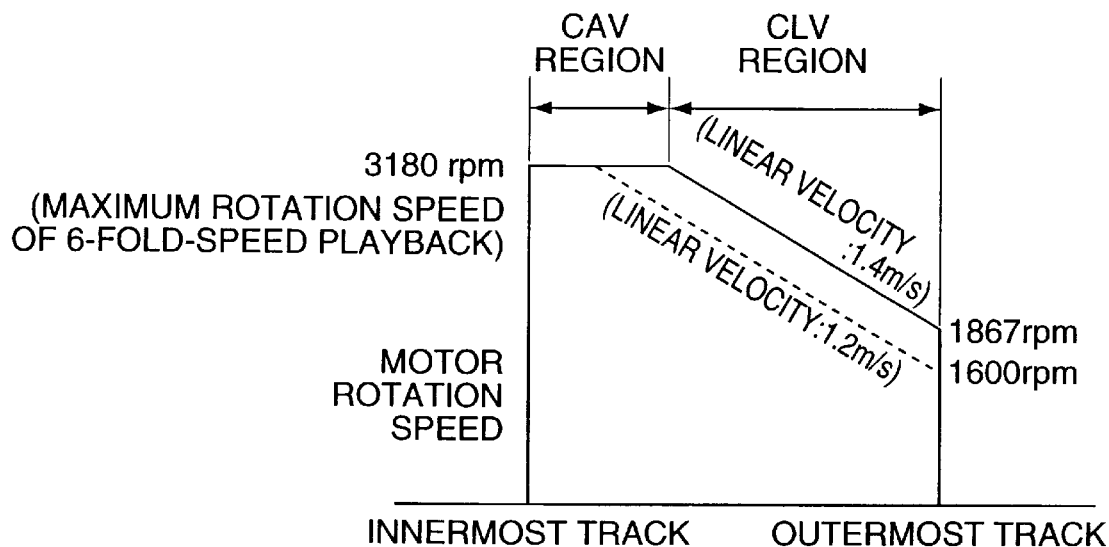
FIG. 3A shows a relationship between the radial position on a disc and the motor rotation speed in the disc playback apparatus according to the first embodiment.

In the disc playback apparatus of the embodiment, the number of motor revolutions per minute 3,180 rpm (see FIG. 3A) is set as the above-mentioned given disc rotation speed that is set by the CPU 6. The rotation speed 3,180 rpm is equal to the maximum motor rotation speed in a 6-fold-speed playback. FIG. 3A shows a relationship between the reproduction position in the disc radial direction and the disc rotation speed, i.e., the number of revolutions per minute of the spindle motor in a case where the disc playback apparatus of the embodiment performs an 8-fold-speed playback. In FIG. 3A, as in the case of FIG. 1A, a solid line and a broken line represent relationships between the reproduction position and the motor rotation speed in 8-fold-speed playbacks corresponding to the normal playback speed linear velocities 1.4 m/s and 1.2 m/s, respectively.

As seen from FIG. 3A, in the disc playback apparatus of the embodiment, where an 8-fold-speed playback is performed at the linear velocity corresponding to the normal playback speed linear velocity 1.4 m/s, a CLV control is performed so that the number of motor revolutions per minute is 1,867 rpm at the disc outermost track and increases toward the disc innermost track. Once the number of motor revolutions per minute has reached 3,180 rpm which corresponds to the given disc rotation speed, a CAV control is performed so as to fix the motor rotation speed at 3,180 rpm. Even at the disc innermost track, the given disc rotation speed is employed. Similarly, where an 8-fold-speed playback is performed at the linear velocity corresponding to the normal playback speed linear velocity 1.2 mls, a CLV control is performed so that the number of motor revolutions per minute is 1,600 rpm at the disc outermost track and increases toward the disc innermost track. Once the number of motor revolutions per minute has reached 3,180 rpm which corresponds to the given disc rotation speed, a CAV control is performed so as to fix the motor rotation speed at 3,180 rpm. Even at the disc innermost track, the given disc rotation speed is employed.

Figure 3B:
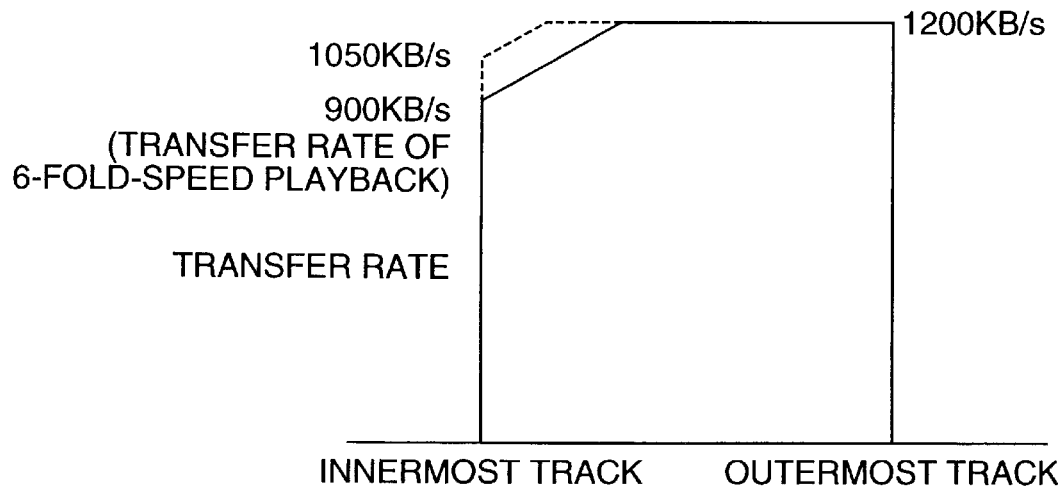
FIG. 3B shows a relationship between the radial direction on a disc and the data transfer rate in the disc playback apparatus according to the first embodiment.

FIG. 3B shows a relationship between the disc radial position and the transfer rate of data that is output from the disc playback apparatus when a CD-ROM is played back with switching between the CLV control and the CAV control at the given disc rotation speed. As seen from FIG. 3B, when the number of motor revolutions per minute is lower than 3,180 rpm, a constant transfer rate of 1,200 KB/s is obtained which is a transfer rate to be obtained when the CD-ROM is played back at an 8-fold speed under the CLV control. On the other hand, when the motor rotation speed is fixed at 3,180 rpm, the transfer rate decreases as the position approaches the innermost track because the CD-ROM is played back under the CAV control. At the disc innermost track, the transfer rate amounts to 900 KB/s, which is the transfer rate of a 6-fold-speed playback.

As described above, in the disc playback apparatus of the embodiment, the CLV control of an 8-fold-speed playback is performed until the number of motor revolutions per minute reaches 3,180 rpm. Once the motor rotation speed has reached 3,180 rpm which is the maximum motor rotation speed of a 6-fold-speed playback, the CAV control is started to keep the disc rotation speed constant.

Disc playback apparatuses which perform a 6-fold-speed playback are already on the market, and hence a spindle motor for realizing a 6-fold-speed playback and its peripheral mechanical parts exhibit stable performance and can be purchased at low prices. On the other hand, in disc playback apparatuses which perform an 8-fold-speed playback, to realize, for instance, a full-stroke access in a short time, a spindle motor capable of producing large torque is needed and the CD-ROM drive mechanical parts should be ones that can withstand such large torque as well as are highly accurate, as described above. In the disc playback apparatus of this embodiment, as described above, the CLV control of an 8-fold-speed playback is performed until the number of motor revolutions per minute reaches 3,180 rpm. Once the motor rotation speed has reached 3,180 rpm which is the maximum motor rotation speed of a 6-fold-speed playback, the CAV control is started to keep the disc rotation speed constant. Therefore, the torque that the spindle motor is required to produce is reduced, the degrees of surface shakes and vibration of a disc can be reduced, and the mechanical parts can be simplified. In addition, the access time can be shortened.

Figure 4:
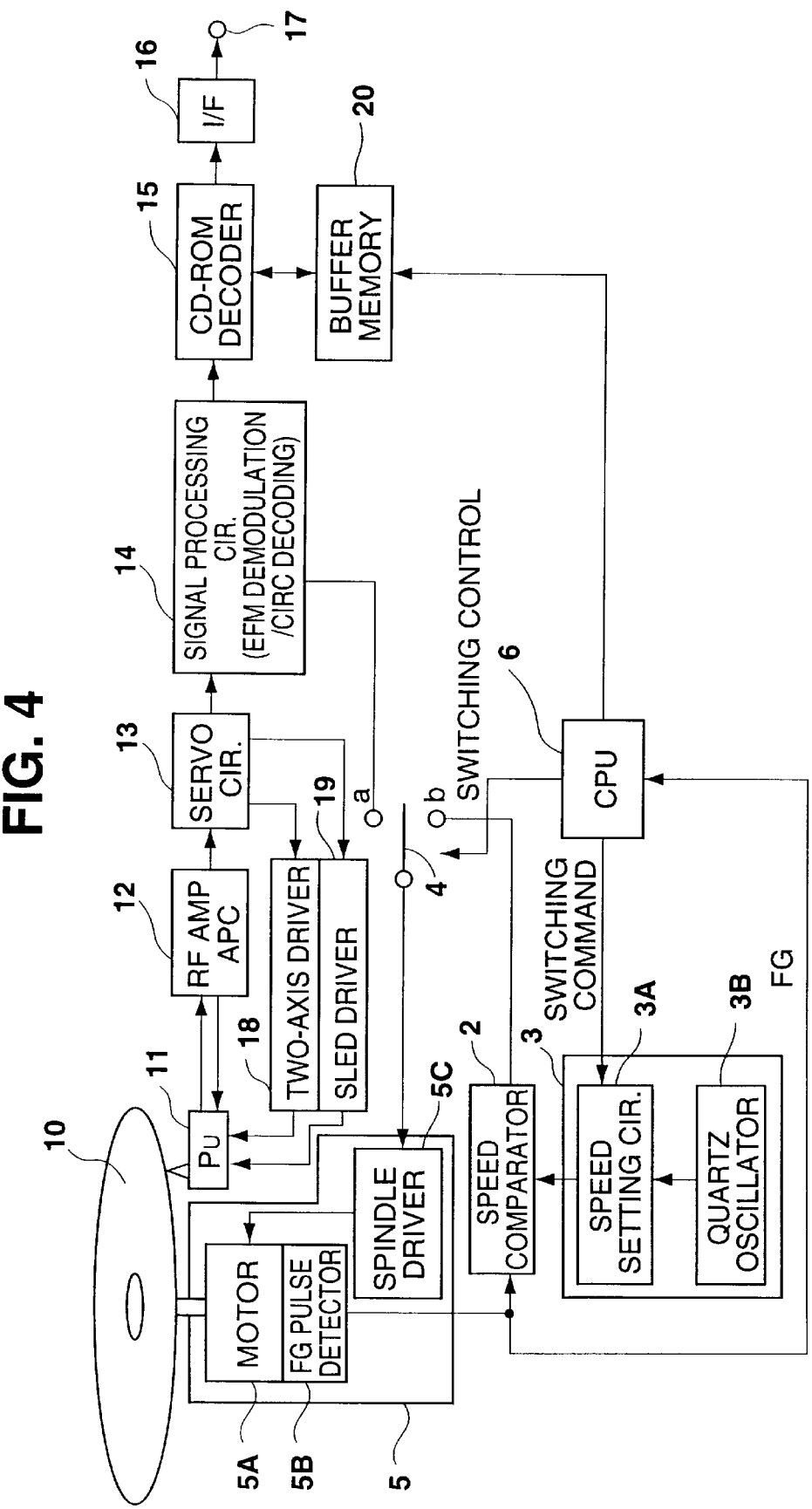
FIG. 4 is a block diagram showing a specific configuration of the disc playback apparatus according to the first embodiment.

FIG. 4 shows a more detailed configuration of the disc playback apparatus of the embodiment having the general configuration of FIG. 2.

Referring to FIG. 4, an optical disc 10 (CD-ROM) is driven, i.e., rotated, by a spindle motor 5A which belongs to the spindle section 5. A FG pulse detector 5B, which is attached to the spindle motor 5A, outputs a FG pulse signal as the spindle motor 5A rotates.

An optical pickup 11 (optical head) has an optical system including a laser light source such as a laser diode, optical parts such as a collimator lens, an objective lens, a polarizing beam splitter, and a cylindrical lens, and a photodetector having a certain pattern. The optical pickup 11 further has a two-axis actuator for driving the objective lens in both of the vertical direction, i.e., the focusing direction, and the horizontal direction, i.e., the tracking direction. In the optical pickup 11, laser light emitted from the laser diode is converted into parallel light by the collimator lens. After passing through the polarizing beam splitter, the parallel light is focused by the objective lens and irradiates the optical disc 10. On the other hand, in the optical pickup 11, the two-axis actuator moves the objective lens in the focusing direction so that the light is focused onto the disc recording surface and also moves the objective lens in the tracking direction so that the focus position is located on a track on the disc recording surface. Light reflected from the optical disc 10 is introduced to the polarizing beam splitter via the objective lens. After the optical path of the reflection light is changed at the polarizing surface of the polarizing beam splitter, the reflection light is guided onto the photodetector via the cylindrical lens. The photodetector extracts a recording signal of the optical disc 10 by converting the guided light into an electrical signal through photoelectric conversion.

An output of the optical pickup 11 is supplied to a RF amplifier circuit 12. The RF amplifier circuit 12 includes an APC (automatic power control) circuit for automatically controlling the laser output power of the laser diode in the optical pickup 11. An output of the RF amplifier circuit 12 is supplied to a servo circuit 13.

Based on the output of the RF amplifier circuit 12, the servo circuit 13 detects a focusing error signal according to what is called an astigmatism method and a tracking error signal according to what is called a push-pull method. The servo circuit 13 supplies the thus-detected focusing error signal and tracking error signal to a two-axis driver 18. Based on the focusing error signal and the tracking error signal, the two-axis driver 18 drives the two-axis actuator in the optical pickup 11. Thus, the focusing servo control and the tracking servo control are attained, according to which the driving of the two-axis actuator in the optical pickup 11 is controlled so that both of the focusing error signal and the tracking error signal become zero.

The output of the RF amplifier circuit 12 is supplied to a signal processing circuit 14. A signal recorded on the optical disc 10 is one obtained through what is called EFM (eight to fourteen modulation). Therefore, the signal processing circuit 14 performs demodulation corresponding to the EFM. Further, since an error correction code of what is called CIRC (cross interleave Reed Solomon code) is added to the signal, the signal processing circuit 14 also performs error correction processing using the error correction code (decoding of the error correction code).

The signal that has been subjected to the demodulation and the error correction processing in the signal processing circuit 14 is supplied to a CD-ROM decoder 15. Since the data recorded on the optical disc 10, i.e., the CD-ROM, have been subjected to a coding process according to the CD-ROM standard, the CD-ROM decoder 15 performs a decoding operation for decoding such data.

A decoded signal of the CD-ROM decoder 15 is output from an output terminal 17 via an interface circuit 16 and supplied to the next stage, which is usually a computer (host computer) because the optical disc 10 is a CD-ROM.

In addition to performing the above-mentioned demodulation and error correction processing on the signal read out from the optical disc 10, the signal processing circuit 14 has the function of the CLV control section 1 shown in FIG. 2. That is, the signal processing circuit 14 extracts a frame sync signal from the signal read out from the optical disc 10 and generates the above-mentioned disc rotation speed control signal for CLV control based on the frame sync signal. The disc rotation speed control signal for CLV control is supplied to the changeover terminal a of the changeover switch 4.

When the changeover terminal a of the changeover switch 4 is selected, the disc rotation speed control signal for CLV control generated by the signal processing circuit 14 is sent to the spindle driver 5C of the spindle section 5. The spindle driver 5C generates a drive voltage for driving the spindle motor 5A from the received disc rotation speed control signal.

On the other hand, the disc rotation speed control signal generated by the speed comparator 2 (see FIG. 2) is supplied to the changeover terminal b of the changeover switch 4. Specifically, the reference clock generator 3 for supplying the reference clock signal to the speed comparator 2 is constituted of a quartz oscillator 3B for generating a clock signal and a speed setting circuit 3A for setting the reference disc rotation speed.

The speed setting circuit 3A generates, in accordance with the speed switching command from the CPU 6, the reference clock signal by frequency-dividing or multiplying the clock signal that is supplied from the quartz oscillator 3B. Thus, plural kinds of reference clock signals, i.e., plural kinds of reference disc rotation speeds, can be set. By switching the reference disc rotation speed in this manner, the switching point between the CLV control and the CAV control (see FIG. 3A) can be changed. In other words, although in the example of FIG. 3A the number of motor revolutions per minute corresponding to the reference disc rotation speed is set at 3,180 rpm, another motor rotation speed can be set by causing the speed setting circuit 3A to properly frequency-divide or multiply the clock signal supplied from the quartz oscillator 3B. Naturally, the motor rotation speed at the switching point between the CLV control and the CAV control can be either lower or higher than 3,180 rpm.

When the changeover terminal b of the changeover switch 4 is selected, the disc rotation speed control signal for CAV control generated by the speed comparator 2 is sent to the spindle driver 5C of the spindle section 5. Thus, the spindle motor 5A is CAV-controlled.

As already described in connection with FIG. 2, the switching control on the changeover switch 4 is performed by the CPU 6. As described above, the CPU 6 measures an actual disc rotation speed based on the FG pulse signal that is supplied from the FG pulse detector 5B of the spindle section 5. When the actual disc rotation speed has reached the preset, given disc rotation speed (i.e., the reference disc rotation speed), the CPU 6 performs a switching control to switch the changeover switch 4 from the changeover terminal a to the changeover terminal b. Conversely, when the actual disc rotation speed is lower than the given disc rotation speed, the CPU 6 performs a switching control to leave the changeover terminal a selected.

Incidentally, where the CAV control is performed as shown in FIG. 3A, the transfer rate, which is constant during the CLV control, varies as shown in FIG. 3B, in which case an undesirable phenomenon may occur in an apparatus connected to the terminal 17 depending on its type. That is, the apparatus connected to the terminal 17 is of a type that requires a constant transfer rate, a certain means is needed that absorbs a transfer rate variation during the CAV control.

To this end, the disc playback apparatus of this embodiment employs a buffer memory 20 which absorbs a transfer rate variation during the CAV control.

That is, in the disc playback apparatus of the embodiment, output data of the signal processing circuit 14 that have been supplied to the CD-ROM decoder 15 are accumulated in the buffer memory 20, and read out from the buffer memory 20 so that a constant transfer rate is obtained. The read-out data are subjected to the decoding operation in the CD-ROM decoder 15. Thus, the CD-ROM decoder 15 produces data of a constant transfer rate. Alternatively, the buffer memory 20 may accumulate data that have been subjected to the decoding operation in the CD-ROM decoder 15. In this case, output data of the signal processing circuit 14 is subjected to the decoding operation in the CD-ROM decoder 15 and resulting data are accumulated in the buffer memory 20. The data are read out from the buffer memory 20 so that a constant transfer rate is obtained. The read-out data are output via the CD-ROM decoder 15.

The above-described data buffering of the data buffer 20 for obtaining a constant transfer rate is realized such that the CPU 6 controls writing and reading data to and from the buffer memory 20. That is, during the CLV control, the CPU 6 provides a constant transfer rate by immediately reading out data that have been written to the buffer memory 20. On the other hand, during the CAV control, the CPU 6 performs a control so that data that have been written to the buffer memory 20 are read out at a constant transfer rate.

The buffer memory 20 may be used only for the CAV control. In this case, for example, a switch is provided between the CD-ROM decoder 15 and the buffer memory 20. During the CLV control, the CPU 6 opens the switch to interrupt data supply to the data buffer 20, to thereby cause data to be supplied from the signal processing circuit 14 to the CD-ROM decoder 15 as they are. During the CAV control, the CPU 6 closes the switch to effect data supply to the buffer memory 20 as in the above case.

Although in the above embodiment the given disc rotation speed is set as the switching point between the CLV control and the CAV control, a given data transfer rate may be set as the switching point. In the latter case, the CPU 6 controls the switching of the changeover switch 4 based on the preset, given data transfer rate. Specifically, in the example of FIG. 3A, in a case where a playback starts from the innermost track, the data transfer rate is 900 KB/s at the beginning and the disc rotation speed control is CAV control. The playback is conducted under the CAV control starting from the innermost track. At a time point when the data transfer rate reaches the given data transfer rate, 1,200 KB/s in this example, the CPU 6 switches the disc rotation speed control from the CAV control to the CLV control.

Next, a disc playback apparatus according to a second embodiment of the invention will be described in detail with reference to FIGS. 5–10.

Figure 5:
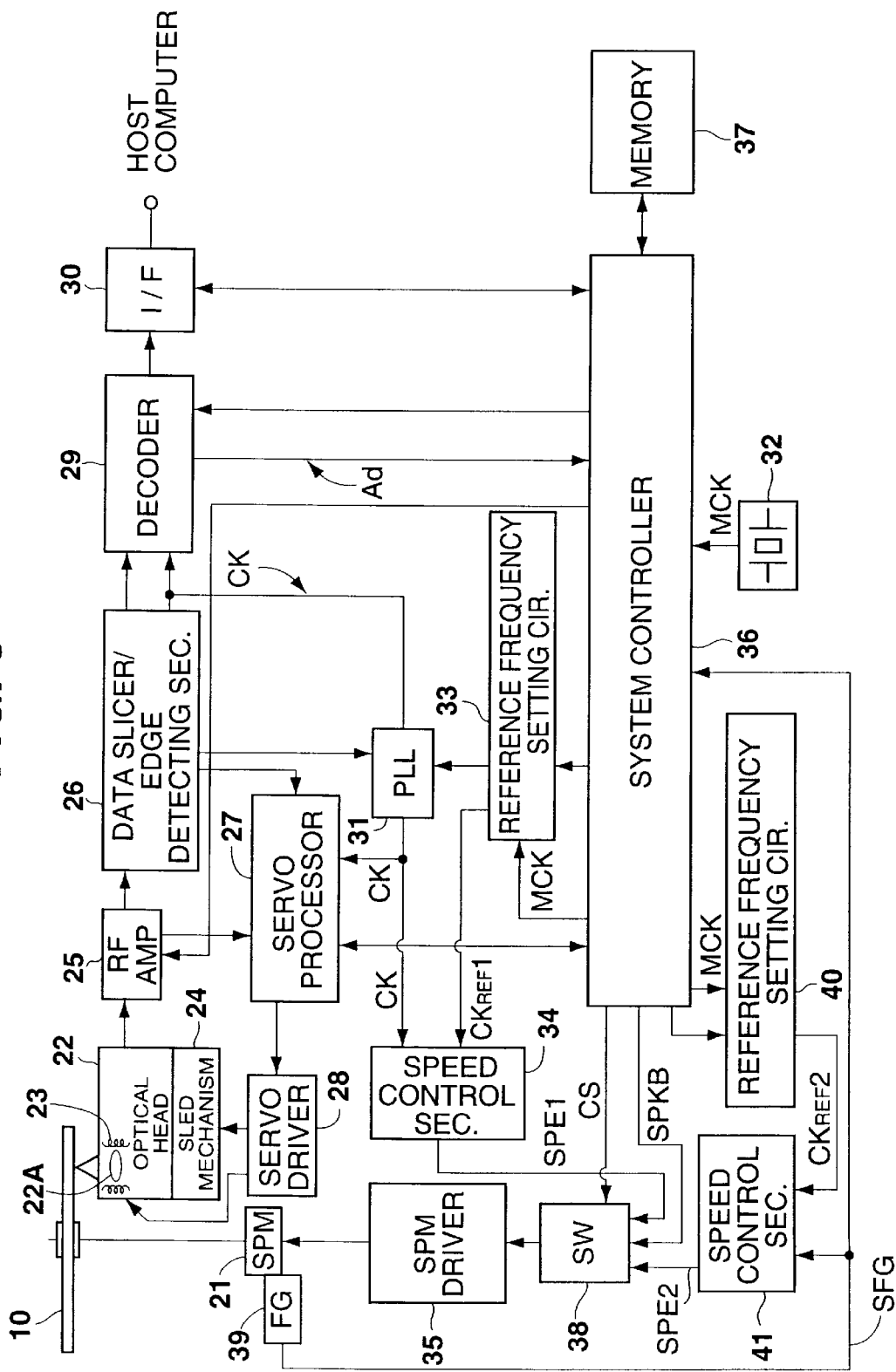
FIG. 5 is a block diagram of a disc playback apparatus according to a second embodiment of the invention.

FIG. 5 is a block diagram of a disc playback apparatus according to a second embodiment of the invention, which is to play pack a CD-ROM as a CLV-type optical disc.

A disc 10 is a CD-ROM mounted on the disc playback apparatus. During a playback, the disc 10 is driven, i.e., rotated, at a constant linear velocity (CLV) by a spindle motor 21. Data that are recorded on the disc 10 in the form of pits are read out by an optical head 22 and then supplied to a RF amplifier 25.

The optical head 22 is mounted with a laser diode as a laser output means, an optical system including a polarizing beam splitter and an objective lens 22A, and a detector for detecting reflection light. The objective lens 22A is held by a two-axis mechanism 23 so as to be movable in the disc radial direction and the direction in which the objective lens 22A goes close to and away from the disc 10. The entire optical head 22 is made movable in the disc radial direction by a sled mechanism 24.

A reproduction RF signal, a tracking error signal, a focusing error signal, and other signals are extracted, through a matrix operation in the RF amplifier 25, from data detected from the disc 10 by the optical head 22 in a playback.

The reproduction RF signal extracted by the RF amplifier 25 is subjected to binarization and edge detection in a data slicer/edge detecting section 26.

A binary signal, i.e., an EFM signal, is supplied to a decoder 29. An edge detection signal produced by the edge detection is supplied to a PLL circuit 31 for generation of a reproduction clock signal. Based on the edge detection signal of the EFM signal, the PLL circuit 31 generates a reproduction clock signal CK that is in synchronism with the EFM signal (i.e., in proportion to the CLV speed of the spindle motor 21) and supplies it to respective sections.

The output of the data slicer/edge detecting section 26 is also supplied to a servo processor 27.

The tracking error signal and the focusing error signal that have been extracted by the RF amplifier 25 are supplied to the servo processor 27. Based on the tracking error signal and the focusing error signals, and a track jump instruction, an access instruction, and other instructions supplied from a system controller that is a microcomputer, the servo processor 27 generates various servo drive signals and causes a servo driver 28 to drive the two-axis mechanism 23 and the sled mechanism 24. Thus, the focusing control and the tracking control are performed.

Receiving the EFM signal from the data slicer/edge detecting section 26, the decoder 29 performs such operations as EFM demodulation, CIRC decoding, and CD-ROM decoding to thereby obtain decoded reproduction data (a data file etc.). As for the decoder 29, a CD-ROM decoding section may be provided separately as in the first embodiment shown in FIG. 4.

The reproduction data are supplied to a host computer via an interface section 30. The decoder 29 also extracts addresses Ad and subcodes, which are supplied to a system controller 36.

Respective operations during a playback are controlled by the system controller 36 that is a microcomputer.

For example, such operations as a start and a termination of a playback, a track access, a fast-feed playback, and a fast-return playback are realized such that the system controller 36 controls the operation of the optical head 22 via the servo processor 27.

Communications with the host computer are performed via the interface section 30. In response to an access request from the host computer, the system controller 36 controls an operation of reproducing a given data file from the disc 10.

A memory 37 stores data, coefficients, tables, etc. that are necessary for various operations of the system controller 36. In this embodiment in which a data table for CLV/CAV switching (described later) is to be stored, the memory 37 is used for that purpose.

Since the disc playback apparatus of this embodiment is directed to a CD-ROM, a disc that has been subjected to CLV-type recording, a playback is basically performed according to CLV scheme. Therefore, the rotation speed of the spindle motor 21 is controlled according to the CLV scheme. To enable a varied speed playback such as a high speed playback as opposed to what is called a 1-fold-speed playback, the apparatus is so constructed as to be able to switch among different rotation speeds, i.e., different linear velocities. That is, not only is a servo system constructed that keeps the rotation speed of the spindle motor 21 at a certain constant linear velocity, but also the linear velocity that should be maintained can be varied.

In this embodiment, a control system for CAV-type rotational driving is also provided. That is, the spindle motor 21 can be driven, i.e., rotated, at a constant rotation speed. In this case, the rotation speed in a constant rotation speed (constant angular velocity) operation can also be varied.

Although in this embodiment both of the linear velocity and the angular velocity can be set in a variable manner, the disc playback apparatus of the invention is not necessarily required to have the configuration for enabling variable setting of the constant linear velocity or the constant angular velocity; the apparatus is at least required to have both of a CLV control system and a CAV control system and to be able to switch between a CLV playback and a CAV playback.

For the CLV servo control of the spindle motor 21, a speed control section 34 and a reference frequency setting circuit 33 are provided. The speed control section 34 is supplied with a reproduction clock signal CK and a reference clock signal $CK_{REF}1$ from the reference frequency setting circuit 33 which operates based on a master clock signal MCK from a quartz-type clock generator 32 under the control of the system controller 36.

The reference clock signal $CK_{REF}1$ is made a clock signal having a frequency that corresponds to a certain constant linear velocity. The reproduction clock signal CK supplied from the PLL circuit 31 has a frequency that corresponds to a constant linear velocity (reproduction linear velocity) of the spindle motor 21. Therefore, by detecting an error of the reproduction clock signal CK from the reference clock signal $CK_{REF}1$, the speed control section 34 can use it as a spindle error signal SPE1 for attaining rotation of a constant linear velocity. During a CLV operation, a switching circuit 38 selects an input from the speed control section 34 based on a control signal CS. Therefore, the spindle error signal SPE1 is supplied to a spindle motor driver 35 via the switching circuit 38. The spindle motor driver 35 applies drive power to the spindle motor 21 in accordance with the spindle error signal SPE1. The CLV servo system of the spindle motor 21 operates in the above manner.

In the above CLV servo system, a CLV servo control at a speed faster or lower than the 1-fold-speed can be realized such that the system controller 36 controls the reference frequency setting circuit 33 to vary the frequency of the reference clock signal $CK_{REF}1$. To enable the PLL circuit 31 to provide proper locking even during a varied speed playback (a playback other than a 1-fold-speed playback), the reference frequency setting circuit 33 sets, in a variable manner, the center frequency of the PLL circuit 31 in accordance with the multiplication number of the varied speed playback.

In a varied speed playback, the system controller 36 switches the frequency characteristic of an equalizer in the RF amplifier 25 in accordance with the multiplication number.

For the CAV servo control of the spindle motor 21, a speed control section 41, a FG (frequency generator) 39, and a reference frequency setting circuit 40 are provided.

The FG 39 outputs a frequency signal SFG having a cycle that corresponds to a rotation speed of the spindle motor 21. That is, the FG 39 outputs a particular number of pulses for each revolution of the spindle motor 21.

The speed control section 41 is supplied with a the frequency signal SFG and a reference clock signal $CK_{REF}2$ from the reference frequency setting circuit 40 which operates based on the master clock signal MCK from the quartz-type clock generator 32 under the control of the system controller 36.

The reference clock signal $CK_{REF}2$ is made a clock signal having a frequency that corresponds to a certain constant angular velocity. The frequency signal SFG supplied from the FG 39 has a frequency that corresponds to a constant angular velocity (rotation speed) of the spindle motor 21. Therefore, by detecting an error of the frequency signal SFG from the reference clock signal $CK_{REF}2$, the speed control section 21 can use it as a spindle error signal SPE2 for attaining a constant angular velocity. During a CAV operation, the switching circuit 38 selects an input from the speed control section 41 based on the control signal CS. Therefore, the spindle error signal SPE2 is supplied to the spindle motor driver 35 via the switching circuit 38. The spindle motor driver 35 applies drive power to the spindle motor 21 in accordance with the spindle error signal SPE2. The CAV servo system of the spindle motor 21 operates in the above manner.

In the above CAV servo system, various rotation speed controls can be realized as CAV operations such that the system controller 36 controls the reference frequency setting circuit 40 so as to vary the frequency of the reference clock signal $CK_{REF}2$. Even during the CAV operation, the reproduction clock signal CK generated by the PLL circuit 31 is in synchronism with the reproduction data (EFM signal). Therefore, there occur no problems in the decoding operation of the decoder 29 even if a CAV-type playback is performed, as long as it is performed within a rotation speed range in which the PLL circuit 31 can establish locking.

If the reference frequency setting circuit 33 sets the center frequency of the PLL circuit 31 in a variable manner in accordance with the constant angular velocity so that what is called a capture range follows the velocity, the constant angular velocity can also be switched in a somewhat larger range.

During a CAV-type playback, the linear velocity gradually increases, which means that frequency of the reproduction clock signal CK also increases gradually. To follow it, the center frequency of the PLL circuit 31 may be gradually shifted during a CAV-type playback.

To forcibly accelerate or decelerate the spindle motor 21, the system controller 36 controls the switching circuit 38 through the control signal CS to open the CLV/CAV servo loop and to cause a spindle kick/brake signal SPKB to be supplied to the spindle motor driver 35. Based on the spindle kick/brake signal SPKB, the spindle motor driver 35 supplies acceleration power or deceleration power to the spindle motor 21, to thereby increase or decrease the rotation speed of the spindle motor 21.

The above-configured disc playback apparatus of this embodiment is featured by the operation that a playback is performed while switching is made between the CLV servo control and the CAV servo control in accordance with the radial reproduction scanning position on the disc 10.

In this embodiment, to provide the timing of servo system switching that is in accordance with the radial position, a data table for speed control switching as shown in FIG. 6, for instance, is stored in the memory 37. This table sets regions in terms of addresses and spindle servo controls for the respective regions. n0 and $n_{LAST}$ are addresses of the innermost track and the outermost track, respectively, and n1 and n2 are particular addresses on the disc 10.

In this example, the table stores data that set, by dividing the disc recording area, three regions, i.e., region-1, region-2, and region-3 which correspond to addresses n0 to n1, n1+1 to n2, and n2+1 to $n_{LAST}$.

The table also stores data for realizing an a-fold-speed CLV servo control, a CAV servo control of a rotation speed N [rpm], and a b-fold-speed CLV servo control which correspond to regions-l to region 3, respectively. Specific examples of data contents are a control on the switching circuit 38 and a value corresponding to a constant linear velocity or a constant angular velocity.

The system controller 36 controls the spindle servo operation while recognizing which of regions-1 to region-3 the current reproduction position belongs to by collating an address detected by the decoder 29 in a playback of the disc 10, i.e., an address of the current reproduction scanning position.

For example, if the current reproduction position belongs to region-1, an a-fold-speed CLV playback is realized by causing the switching circuit 38 to select the input (spindle error signal SPE1) from the speed control section 34 and causes the reference frequency setting circuit 33 to perform an operation for the a-fold-speed playback.

If a detected address is larger than n1 and it is detected that the current reproduction position belongs to region-2, a CAV playback of the rotation speed N is realized by causing the switching circuit 38 to select the input (spindle error signal SPE2) from the speed control section 41 and causing the reference frequency setting circuit 40 to output a reference clock signal $CK_{REF}2$ corresponding to the rotation speed N [rpm].

If the current reproduction position belongs to region-3, a b-fold-speed CLV playback is realized by causing the switching circuit 38 to select the input (spindle error signal SPEL) from the speed control section 34 and causes the reference frequency setting circuit 33 to perform an operation for the b-fold-speed playback.

FIG. 7 shows a relationship between the disc radial position and the rotation speed realized by the above operations.

It is assumed that addresses n0, n1, n2, and $n_{LAST}$ in FIG. 6 correspond to disc positions shown on the horizontal axis of FIG. 7.

In region-1, i.e., in the section of addresses n0 to n1, a playback is performed at the a-fold-speed linear velocity.

In region-2, i.e., in the section of addresses n1+1 to n2, a CAV playback is performed at the notation speed N.

In region-3, i.e., in the section of addresses n2+1 to $n_{LAST}$, a playback is performed at the b-fold-speed linear velocity.

As a result, the rotation speed varies in the disc radial direction as shown in FIG. 7. A difference Vd1 between the rotation speed at the innermost track and that at the outermost track can be made smaller than in the ordinary CLV playback shown in FIG. 1A.

The fact that the speed difference Vd1 is smaller than the conventional speed difference means that an adjustment range of the spindle motor speed which is adjusted by acceleration or deceleration during an access can be made smaller, that is, a time required for an adjusting and settling operation for attaining a rotation speed suitable for an accessed position can be shortened. That is, the access time can be shortened. A reduction in acceleration or deceleration range means a reduction in the power consumed by acceleration or deceleration. Power saving is thus promoted.

Figure 10:
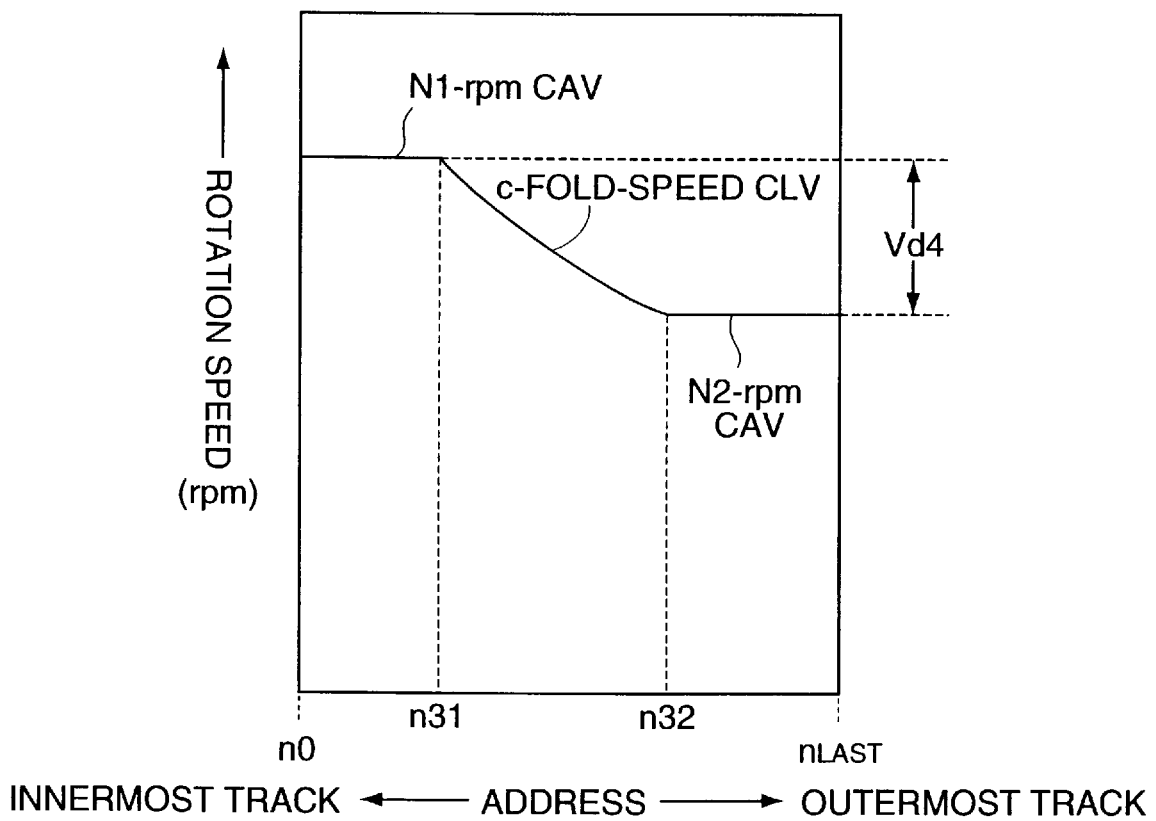

In this embodiment, the rotation speed switching control shown in FIG. 7 is performed by using the data table shown in FIG. 6. Regions in the disc radial direction and linear and angular velocities in the respective regions may be set in various manners. FIGS. 8–10 show four other examples.

FIG. 8 shows an example for further reducing the rotation speed difference between the disc innermost and outermost tracks. An a-fold-speed playback is performed for inner tracks and a CAV playback of a rotation speed N [rpm] is performed for outer tracks with a particular address nil as a boundary.

Since the relationship between the disc radial scanning position and the rotation speed of the spindle motor 21 shown in FIG. 8 is attained, a speed difference Vd2 between the innermost and outermost tracks can be made smaller than in the example of FIG. 7 and hence the access time and the power consumption can be made shorter or smaller than in the latter.

A rotation speed control shown in FIG. 9 is equivalent to that of the first embodiment already described above in connection with FIG. 3. Conversely to the example of FIG. 8, in the example of FIG. 9, a c-fold-speed CLV playback is performed for outer tracks and a CAV playback of a rotation speed N1 is performed for inner tracks with a particular address n21 as a boundary.

The relationship between the disc radial scanning position and the rotation speed of the spindle motor 21 shown in FIG. 9 is attained. As in the example of FIG. 8, a speed difference Vd3 between the innermost and outermost tracks can be made smaller than in the example of FIG. 7 and hence the access time and the power consumption can be made shorter or smaller than in the latter.

Figure 1B:
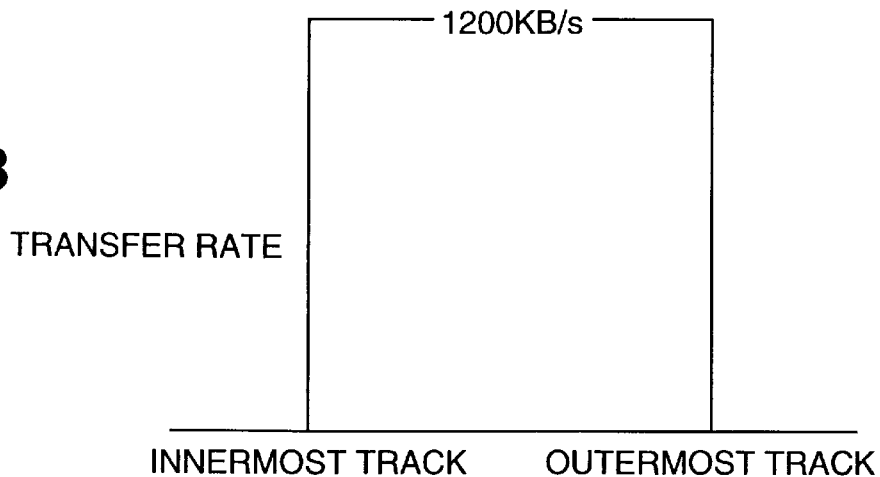
FIG. 1B shows a relationship between the radial direction on a disc and the data transfer rate in the conventional disc playback apparatus.

The example of FIG. 9 is particularly useful for an exceptionally high-speed playback of 12-fold speed, for instance. Although reading, for instance, of a data file can be quickened by increasing the transfer rate by employing a high-speed playback, rotation speeds at inner tracks become faster as the constant linear velocity is increased as seen from, for instance, the ordinary CLV playback shown in FIG. 1. When the rotation speed is increased, vibration due to a deviated center of gravity of the disc may be amplified. Further, there may occur other unfavorable effects such as increased power consumption and increased heat generation.

By employing a CAV playback for inner tracks as in the example of FIG. 9, even in a playback for inner tracks the transfer rate during a CLV playback can be increased while avoiding high rotation speeds that would otherwise cause the above-mentioned unfavorable effects.

FIG. 10 shows an example for making the speed difference between the innermost and outermost tracks even smaller than in the example of FIG. 9. The spindle servo control is switched for an inner region, an intermediate region, and an outer region with particular addresses n31 and n32 as boundaries. That is, a CAV playback of a rotation speed N1 [rpm] is performed for the inner region, a c-fold-speed CLV playback is performed for the intermediate region, and a CAV playback of a rotation speed N2 [rpm] is performed for the outer region.

As a result, a speed difference Vd4 between the innermost and outermost tracks can be made smaller than the speed difference Vd3 in the example of FIG. 7 and hence the access time and the power consumption can be made shorter or smaller than in the latter. As in the example of FIG. 9, this example is naturally effective in increasing the constant linear velocity.

Although various examples were described above, it goes without saying that the second embodiment is not limited to the above examples and other various examples are possible. In particular, the divisional number of regions and setting values of linear and angular velocities for the respective regions should be set in accordance with the characteristics, circuit configuration, processing ability, and other factors of each disc playback apparatus.

The second embodiment is directed to the case where the rotation speed control is switched for each region that is judged from the address by using the data table. Alternatively, another control scheme is possible in which the rotation speed of the spindle motor 21 that is detected by the FG 39 is monitored and switching is made from a CLV servo control to a CAV control or vice versa at a time point when the rotation speed becomes a preset value.

Next, a disc playback apparatus according to a third embodiment of the invention will be described in detail with reference to FIGS. 11–17.

Figure 11:
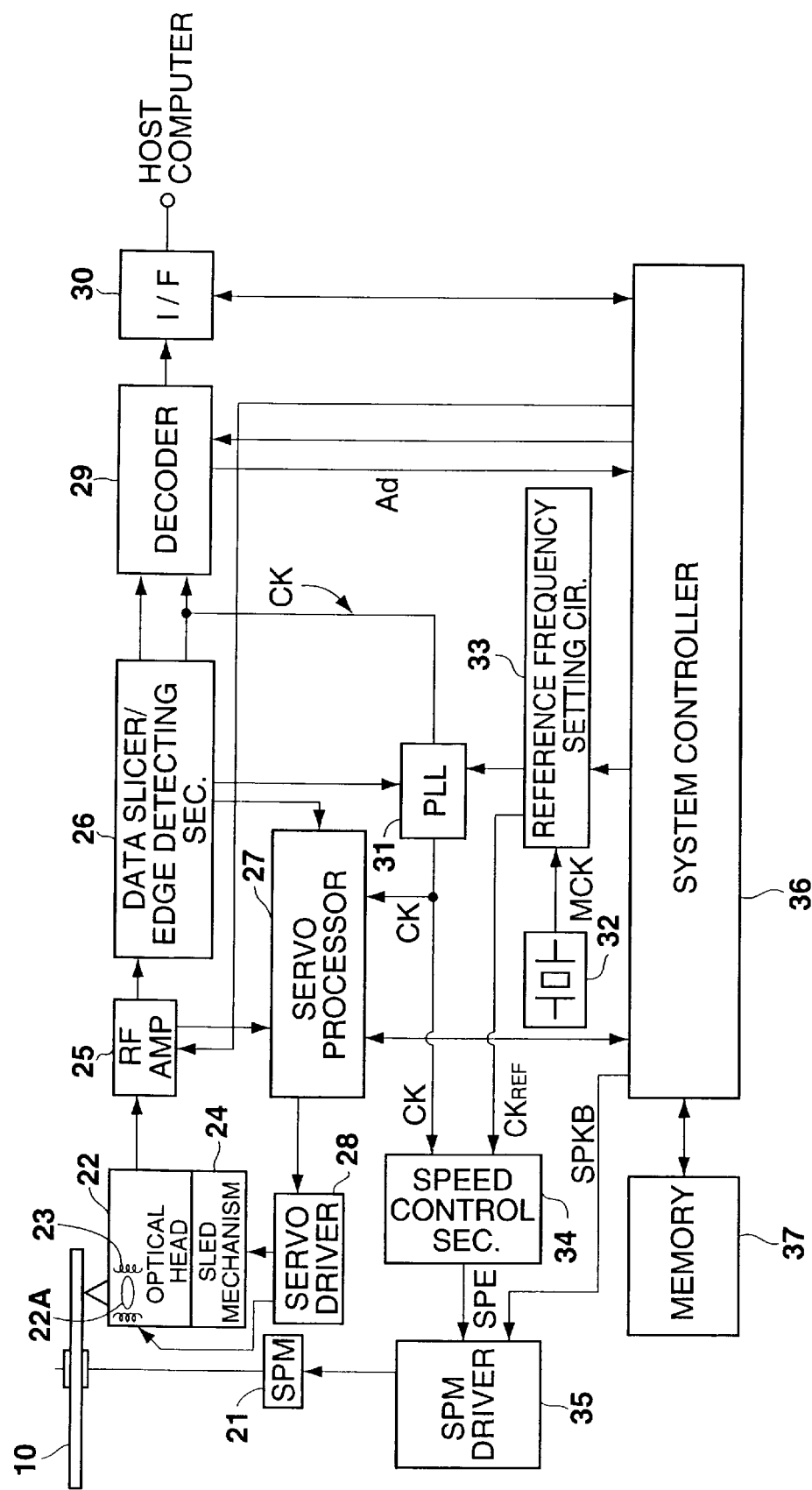
FIG. 11 is a block diagram of a disc playback apparatus according to a third embodiment of the invention.

FIG. 11 is a block diagram of a disc playback apparatus according to the third embodiment for a CD-ROM that is a CLV-type optical disc. The circuit components in FIG. 11 having the same configurations as in FIG. 5 are given the same reference symbols and descriptions therefor will be omitted.

The speed control section 34 is provided for CLV servo control of the spindle motor 21. The speed control section 34 is supplied with a reproduction clock signal CK and a reference clock signal $CK_{REF}$ from the reference frequency setting circuit 33 which operates based on a master clock signal MCK from a quartz-type clock generator 32.

The reference clock signal $CK_{REF}$ is made a clock signal having a frequency that corresponds to a certain constant linear velocity. The reproduction clock signal CK supplied from the PLL circuit 31 has a frequency that corresponds to a constant linear velocity (reproduction linear velocity) of the spindle motor 21. The speed control section 34 detects an error of the reproduction clock signal CK from the reference clock signal $CK_{REF}$, and outputs it as a spindle error signal SPE. The spindle motor driver 35 applies drive power to the spindle motor 21 in accordance with the spindle error signal SPE. The CLV servo system of the spindle motor 21 operates in the above manner.

In the above CLV servo system, a CLV servo control at a speed faster or lower than the 1-fold-speed can be realized such that the system controller 36 controls the reference frequency setting circuit 33 to vary the frequency of the reference clock signal $CK_{REF}$. To enable the PLL circuit 31 to provide proper locking even during a varied speed playback (a playback other than a 1-fold-speed playback), the reference frequency setting circuit 33 sets, in a variable manner, the center frequency of the PLL circuit 31 in accordance with the multiplication number of the varied speed playback.

In a varied speed playback, the system controller 36 switches the frequency characteristic of an equalizer in the RF amplifier 25 in accordance with the multiplication number.

To forcibly accelerate or decelerate the spindle motor 21, the CLV/CAV servo loop is opened and the system controller 36 causes a spindle kick/brake signal SPKB to be supplied to the spindle motor driver 35. Based on the spindle kick/brake signal SPKB, the spindle motor driver 35 supplies acceleration power or deceleration power to the spindle motor 21, to thereby increase or decrease the rotation speed of the spindle motor 21.

In the above-configured disc playback apparatus of this embodiment, a plurality of regions are set in the radial direction of the disc 10 and a playback is performed while the linear velocity is switched for each region.

To this end, a data table for linear velocity switching as shown in FIG. 12, for instance, is stored in the memory 37. This table sets regions in terms of addresses and linear velocities for the respective regions. n0 and $n_{LAST}$ are addresses of the innermost track and the outermost track, respectively, and n1 to n2 are particular addresses on the disc 10.

In this example, the table stores data that set, by dividing the disc recording area, five regions, i.e., region-1 to region-5 which correspond to addresses n0 to n1, n1+1 to n2, n2+1 to n3, n3+1 to n4, and n4+1 to $n_{LAST}$, respectively.

The table also sets linear velocities for region-1 to region-5, respectively, i.e., linear velocities of an h-fold speed, an (h+0.5)-fold speed, an (h+1.0)-fold speed, an (h+1.5)-fold speed, and an (h+2.0)-fold speed.

The system controller 36 sets a linear velocity by recognizing which of regions-1 to region-5 the current reproduction position belongs to by collating an address detected by the decoder 29 in a playback of the disc 10, i.e., an address of the current reproduction scanning position.

For example, if the current reproduction position belongs to region-1, the system controller 36 causes the reference frequency setting circuit 33 to perform an operation for an h-fold-speed CLV playback. When the detected address has exceeded n1 and hence it is detected that the reproduction position has entered region-2, the system controller 36 switches the operation of the reference frequency setting circuit 33 to one for an (h+0.5)-fold-speed playback.

Figure 13:
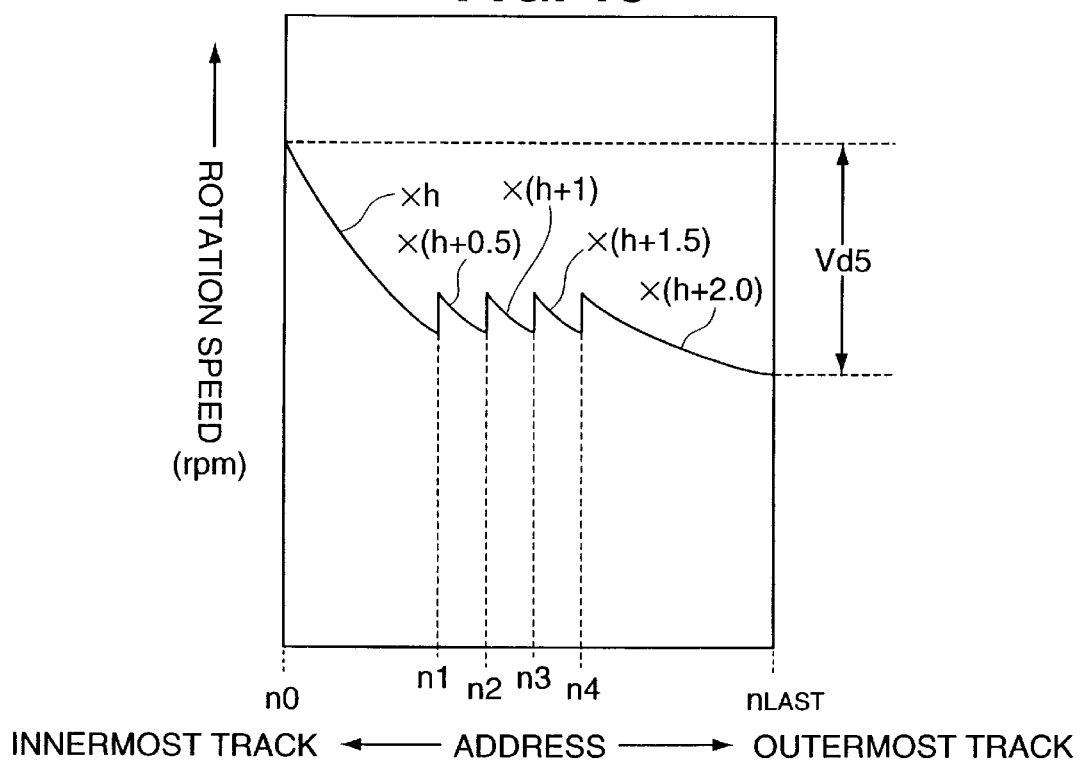
FIG. 13 shows a relationship between the disc regions and rotation speeds in the disc playback apparatus according to the third embodiment.

FIG. 13 shows a relationship between the disc radial position and the rotation speed realized by the above operations.

It is assumed that addresses n0, n1–n4, and $n_{LAST}$ in FIG. 12 correspond to disc positions shown on the horizontal axis of FIG. 13.

In region-1, i.e., in the section of addresses n0 to n1, a playback is performed at an h-fold-speed linear velocity (a 1-fold speed when h=1, and a 2-fold speed when h=2).

In region-2, i.e., in the section of addresses n1+1 to n2, a playback is performed at an (h+0.5)-fold speed linear velocity (a 1.5-fold speed when h=1, and a 2.5-fold speed when h=2).

In region-3, i.e., in the section of addresses n2+1 top n3, a playback is performed at an (h+1.0)-fold speed linear velocity (a 2-fold speed when h=1, and a 3-fold speed when h=2).

Similarly, in region-4 of addresses n3+1 to n4, a playback is performed at an (h+1.5)-fold speed linear velocity. In region-5 of addresses n4+1 to $n_{LAST}$, a playback is performed at an (h+2.0)-fold-speed linear velocity.

As a result, the rotation speed varies in the disc radial direction as shown in FIG. 13. A difference Vd5 between the rotation speed at the innermost track and that at the outermost track can be made smaller than in the ordinary CLV playback shown in FIG. 1A.

The fact that the speed difference Vd5 is smaller than the conventional speed difference means that an adjustment range of the spindle motor speed which is adjusted by acceleration or deceleration during an access can be made smaller, that is, a time required for an adjusting and settling operation for attaining a rotation speed suitable for an accessed position can be shortened. That is, the access time can be shortened. A reduction in acceleration or deceleration range means a reduction in the power consumed by acceleration or deceleration. Power saving is thus promoted.

In this embodiment, the rotation speed switching control shown in FIG. 13 is performed by using the data table shown in FIG. 12. Regions in the disc radial direction and linear velocities in the respective regions may be set in various manners. FIGS. 14–17 show four other examples.

Figure 14:
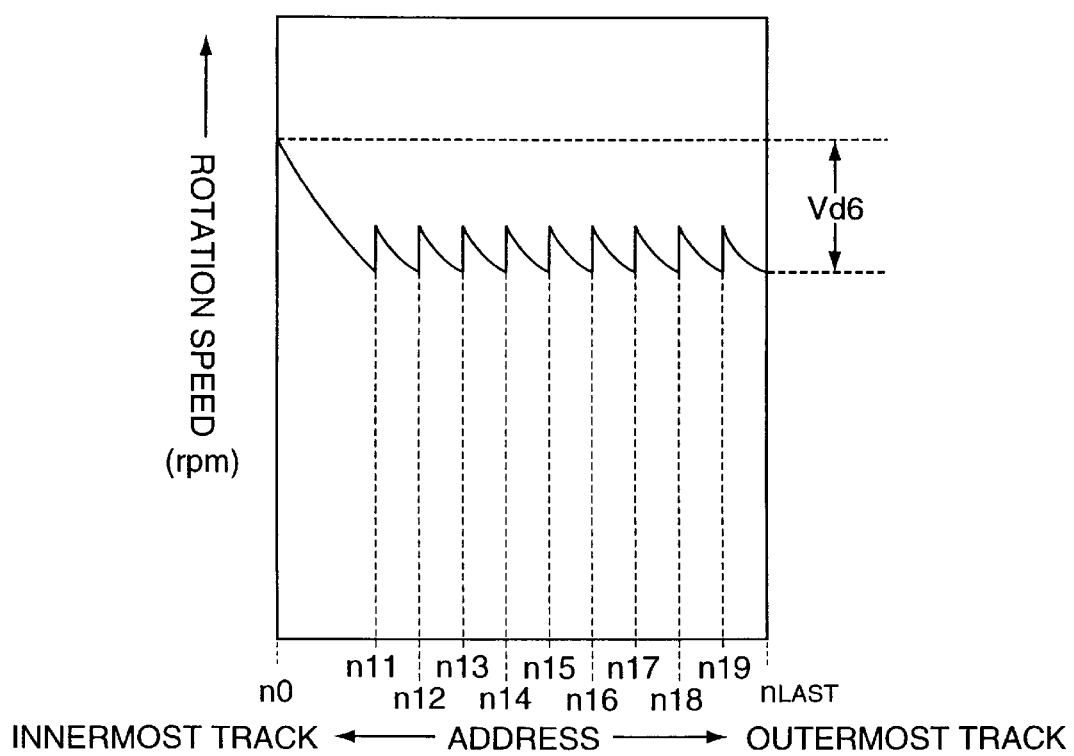
FIGS. 14–17 show linear velocity switching schemes in the disc playback apparatus according to modifications of the third embodiment.

FIG. 14 shows an example in which regions are smaller than in the example of FIG. 13. The disc recording area is divided into 10 regions with particular addresses n11–n19 as boundaries. The relationship between the disc radial scanning position and the rotation speed of the spindle motor 21 shown in FIG. 14 is attained by increasing (switching) the linear velocity in a region toward the outermost track. Thus, a speed difference Vd6 between the innermost and outermost tracks is obtained which is smaller than in the example of FIG. 13 and hence the access time and the power consumption can be made shorter or smaller than in the latter.

Figure 15:
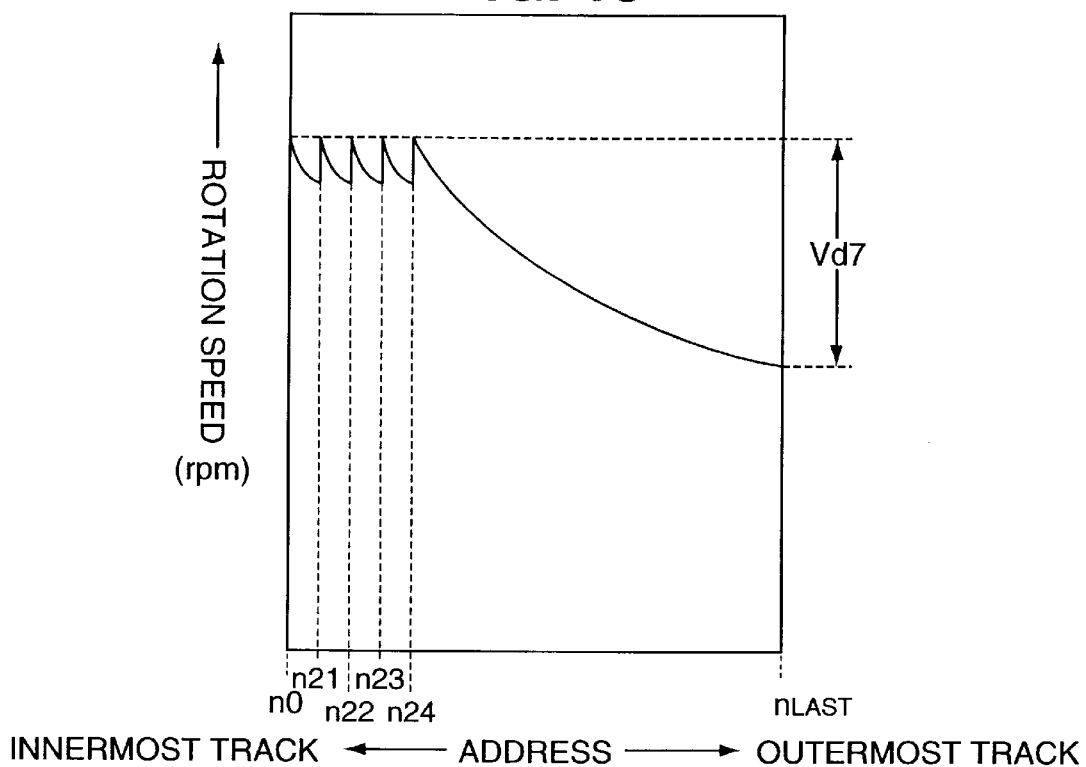

An example of FIG. 15 is effective in a case where it is intended to obtain a large transfer rate for disc inner tracks. In this example, an inner disc area is divided into small regions with particular addresses n21–n24 as boundaries and the linear velocity is switched for each region.

In this example, the rotation speed is kept high in the disc inner area and hence the transfer rate is increased there.

Figure 16:
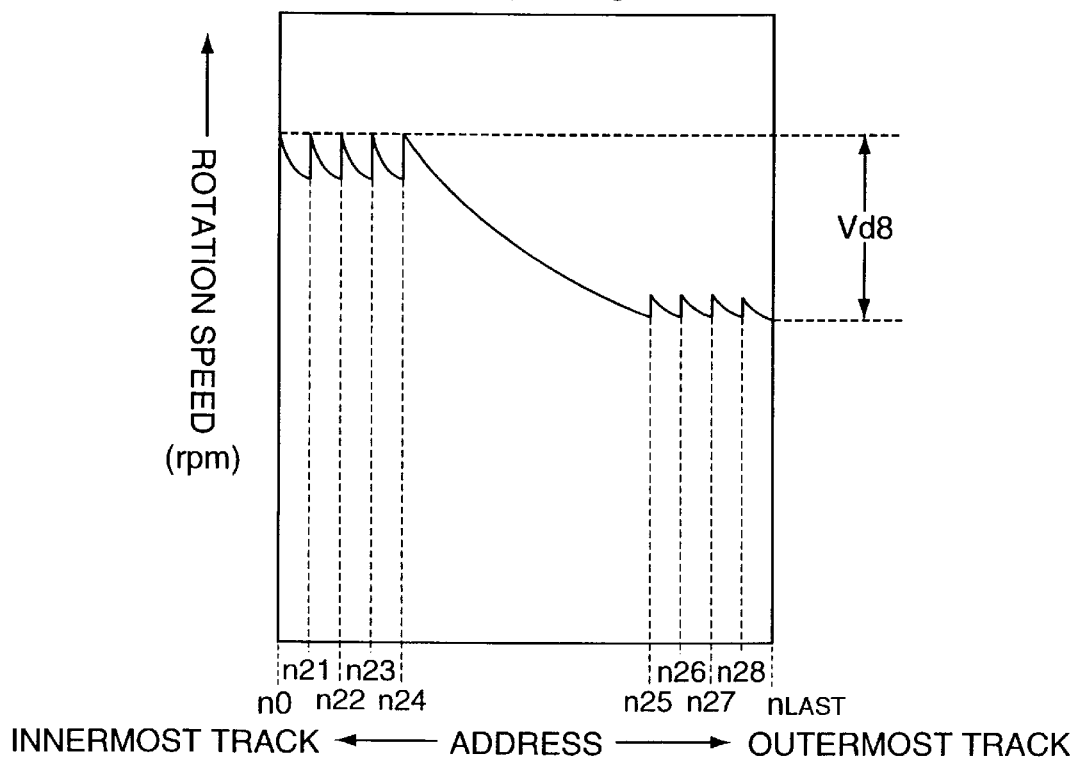

An example of FIG. 16 is intended to increase the transfer rate as in the example of FIG. 15 and make the speed difference between the innermost and outermost tracks smaller than in the latter.

While a disc inner area is divided into small regions with particular addresses n21–n24 as boundaries as in the example of FIG. 15, a disc outer area is divided into small regions with particular addresses n25–n28 as boundaries. The total number of regions is nine. The relationship between the disc radial scanning position and the rotation speed of the spindle motor 21 shown in FIG. 16 is attained by increasing (switching) the linear velocity in a region toward the outermost track.

Thus, a speed difference Vd8 between the innermost and outermost tracks is obtained which is smaller than the speed difference Vd7 in the example of FIG. 15 and hence the access time and the power consumption can be made shorter or smaller than in the latter.

Figure 17:
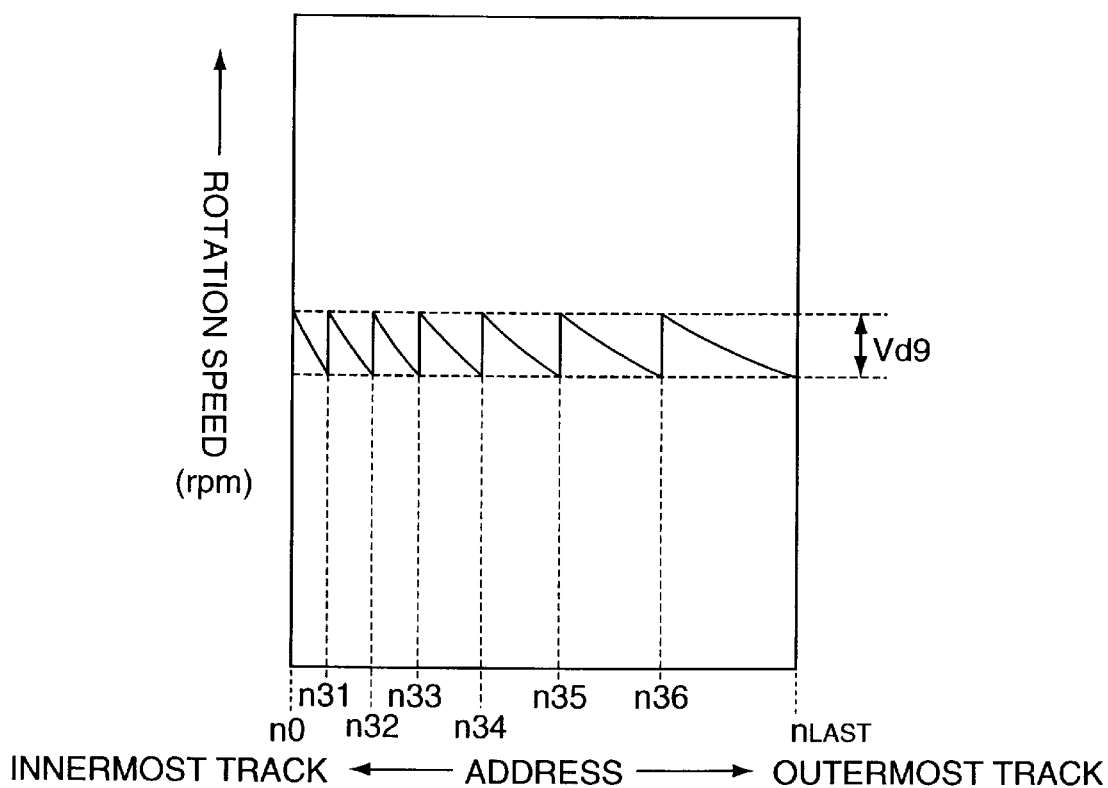

An example of FIG. 17 is to minimize the speed difference between the innermost and outermost tracks. The disc recording area is divided into small regions with particular addresses n31–n36 as boundaries. The linear velocity in a region is increased (switched) toward the outermost track. In this example, a speed difference Vd9 between the innermost and outermost tracks is extremely small.

Although various examples were described above, it goes without saying that the third embodiment is not limited to the above examples and other various examples are possible. In particular, the divisional number of regions and setting values of linear velocities for the respective regions should be set in accordance with the characteristics, circuit configuration, processing ability, and other factors of each disc playback apparatus. Further, the third embodiment is directed to the case where the linear velocity is switched by using the data table (see FIG. 12). Naturally another control scheme is possible in which the linear velocity is switched for each region by performing a computation by using a detected address.

What is claimed is:

1. A disc playback apparatus which plays back a disc-like recording medium on which data have been recorded at a predetermined constant linear velocity, comprising:

CLV control means for controlling a disc rotation speed so that a linear velocity is kept constant;

CAV control means for controlling the disc rotation speed so that an angular velocity is kept constant;

switching means for switching a disc rotation control between a control by the CLV control means and a control by the CAV control means;

point setting means for setting a disc rotation control switching point of the switching means; and control means for controlling switching of the switching means in accordance with the switching point that is set by the point setting means, wherein the point setting means sets a given data transfer rate as the switching point, and wherein the control means controls the switching of the switching means in accordance with the given data transfer rate thus set.

2. The disc playback apparatus according to claim 1, wherein the point setting means sets a given disc rotation speed as the switching point, and wherein the control means controls the switching of the switching means in accordance with the given disc rotation speed thus set.

3. The disc playback apparatus according to claim 2, wherein the control means switches the disc rotation control from the control by the CLV control means to the control by the CAV control means when the disc rotation speed has reached the given disc rotation speed.

4. The disc playback apparatus according to claim 1, wherein the control means switches the disc rotation control from the control by the CAV control means to the control by the CLV control means when a data transfer rate has reached the given disc transfer rate.

5. The disc playback apparatus according to claim 1, further comprising angular velocity setting means for setting a constant angular velocity for the control by the CAV control means.

6. The disc playback apparatus according to claim 1, further comprising buffer memory means for accumulating and outputting data that are read out from the disc-like recording medium, wherein the control means causes the buffer memory means to accumulate data that are read out from the disc-like recording medium in a state that the disc rotation speed is controlled by the CAV control means, and to output the accumulated data at a constant data transfer rate.

7. A disc playback method for playing back a disc-like recording medium on which data have been recorded at a predetermined constant linear velocity, comprising:

a CLV control step of controlling a disc rotation speed so that a linear velocity is kept constant;

a CAV control step of controlling the disc rotation speed so that an angular velocity is kept constant;

a switching step of switching a disc rotation control between a control by the CLV control step and a control by the CAV control step;

a point setting step of setting a disc rotation control switching point of the switching step; and a control step of controlling switching of the switching step in accordance with the switching point that is set by the point setting step, wherein the point setting step sets a given data transfer rate as the switching point, and wherein the control step controls the switching of the switching step in accordance with the given data transfer rate thus set.

8. The disc playback method according to claim 7, wherein the point setting step sets a given disc rotation speed as the switching point, and wherein the control step controls the switching of the switching step in accordance with the given disc rotation speed thus set.

9. The disc playback method according to claim 8, wherein the control step switches a disc rotation control step from the CLV control step to the CAV control step when the disc rotation speed has reached the given disc rotation speed.

10. The disc playback method according to claim 7, wherein the control step switches a disc rotation control step from the CAV control step to the CLV control step when a data transfer rate has reached the given disc transfer rate.

11. The disc playback method according to claim 7, further comprising an angular velocity setting step of setting a constant angular velocity for the CAV control step.

12. The disc playback method according to claim 7, further comprising a buffering step of accumulating, in a buffer memory, data that are read out from the disc-like recording medium in the CAV control step, and a step of causing the buffer memory to output the accumulated data at a constant data transfer rate.

* * * * *